US012789936B2

(12) United States Patent
Yu

(10) Patent No.: US 12,789,936 B2
(45) Date of Patent: Nov. 10, 2026

(54) RIDING AUXILIARY WARNING DEVICE

(71) Applicant: TERASILIC CO., LTD., New Taipei City (TW)

(72) Inventor: Shih-An Yu, New Taipei City (TW)

(73) Assignee: TERASILIC CO., LTD., New Taipei City (TW)

( * ) Notice: Subject to any disclaimer, the term of this patent is extended or adjusted under 35 U.S.C. 154(b) by 0 days.

(21) Appl. No.: 19/195,522

(22) Filed: Apr. 30, 2025

(65) Prior Publication Data

US 2026/0159191 A1 Jun. 11, 2026

Related U.S. Application Data

(60) Provisional application No. 63/729,787, filed on Dec. 9, 2024.

(51) Int. Cl.

| | |
|---|---|
| ***B62J 50/22*** | (2020.01) |
| ***B62J 45/41*** | (2020.01) |
| ***B62J 45/42*** | (2020.01) |
| ***B62J 50/21*** | (2020.01) |
| ***G01S 13/86*** | (2006.01) |
| ***G01S 13/931*** | (2020.01) |
| ***G08G 1/16*** | (2006.01) |
| ***H04N 7/18*** | (2006.01) |

(Continued)

(52) U.S. Cl.
CPC ............... *B62J 50/22* (2020.02); *B62J 45/41* (2020.02); *B62J 45/42* (2020.02); *B62J 50/225* (2020.02); *G01S 13/867* (2013.01); *G01S 13/931* (2013.01); *G08G 1/166* (2013.01); *H04N 7/183* (2013.01); *H04N 7/188* (2013.01); *H04N 23/57* (2023.01); *H04N 23/667* (2023.01); *G01S 2013/93272* (2020.01)

(58) Field of Classification Search
CPC ... B62J 50/22; B62J 45/41; B62J 45/42; B62J 50/225; G01S 13/867; G01S 13/931; G01S 2013/93272; G08G 1/166; H04N 7/183; H04N 7/188; H04N 23/57; H04N 23/667
USPC ........................................................ 348/149
See application file for complete search history.

(56) References Cited

U.S. PATENT DOCUMENTS

| | | | | |
|---|---|---|---|---|
| 10,393,872 | B2 | 8/2019 | Brisimitzakis et al. | |
| 2009/0033475 | A1 * | 2/2009 | Zuziak ...................... | B62J 3/10 340/432 |
| 2017/0160392 | A1 * | 6/2017 | Brisimitzakis ............ | G01S 7/24 |

FOREIGN PATENT DOCUMENTS

| | | | |
|---|---|---|---|
| KR | 102463498 | B1 | 11/2022 |

* cited by examiner

*Primary Examiner* — John W Miller
*Assistant Examiner* — Omer Khalid

(57) ABSTRACT

A riding auxiliary warning device is adapted for being installed on a bicycle. The riding auxiliary warning device includes a radar module, a camera module, and a display module. The radar module is disposed on an end fixing component. The radar module is adapted for detecting a rear-approaching vehicle and sending a trigger signal when a warning condition is reached. The camera module is electrically connected to the radar module. When the warning condition is not reached, the camera module is in a sleep mode. The camera module is adapted for being activated after receiving the trigger signal to take pictures and send image information of the rear-approaching vehicle. The display module is disposed on a faucet electrically connected to the radar module and the camera module. The display module includes a screen, and the screen is adapted for displaying the image information of the rear-approaching vehicle.

16 Claims, 5 Drawing Sheets

(51) Int. Cl.

| | |
|---|---|
| ***H04N 23/57*** | (2023.01) |
| ***H04N 23/667*** | (2023.01) |

RIDING AUXILIARY WARNING DEVICE

CROSS-REFERENCE TO RELATED APPLICATION

This application claims the priority benefit of U.S. Provisional Application (No. 63/729,787), filed on Dec. 9, 2024. The entirety of the above-mentioned patent application is hereby incorporated by reference herein and made a part of this specification.

FIELD OF THE INVENTION

The invention relates to a warning device, in particular to a riding auxiliary warning device.

BACKGROUND OF THE INVENTION

With a rise in prices of gasoline and an increase in environmental awareness, more and more people are using bicycles as transportation. Many safety devices, such as reflective jackets, reflective strips, LED lights, etc., have been widely used to increase the safety of riding bicycles. Although this type of safety device can increase visibility of a bicycle or a rider, it does not provide real-time feedback when nearby vehicles are approaching.

Because bicycles often pose a hazard to vehicles approaching from behind or from a side, the rider of the bicycle may not be aware of this approach before impact. Therefore, there is a need for a warning device, and how to make the warning device have power saving and can have a longer usage time is what the industry is striving for.

SUMMARY OF THE INVENTION

The invention provides a riding auxiliary warning device, which has an effect of power saving and extending the usage time. At the same time, the riding auxiliary warning device can avoid safety concerns caused by a rider having to look down at a screen from time to time.

In order to achieve one, part or all of the above purposes or other purposes, one embodiment of the present invention provides the riding auxiliary warning device, which is adapted for installation on a bicycle. The bicycle includes a faucet and an end fixing component. The riding auxiliary warning device includes a radar module, a camera module, and a display module. The radar module is disposed on the end fixing component of the bicycle. The radar module is adapted for detecting a rear-approaching vehicle and sending a trigger signal when a warning condition is reached between the detected rear-approaching vehicle and the bicycle. The camera module is disposed on the bicycle and electrically connected to the radar module. The camera module is adapted for being in a sleep mode when the warning condition between the rear-approaching vehicle and the bicycle is not reached. And, the camera module is adapted for being activated after receiving the trigger signal to take pictures of the rear-approaching vehicle and sending image information of the rear-approaching vehicle. And, the display module is disposed on the faucet of the bicycle, and is electrically connected to the radar module and the camera module. The display module includes a screen, and the screen is adapted for displaying the image information of the rear-approaching vehicle.

In one embodiment of the present invention, the end fixing component is a seat tube, a rack, or a taillight of the bicycle.

In one embodiment of the present invention, the camera module is disposed at the end fixing component, and the camera module is connected with the radar module through a transmission line or a communication connection.

In one embodiment of the present invention, the radar module is in communication connection with the display module.

In one embodiment of the present invention, the display module is adapted for activating the screen to display the image information of the rear-approaching vehicle sent from the camera module after receiving the trigger signal.

In one embodiment of the present invention, the display module further includes an on-screen display (OSD) interface, and an incoming vehicle warning signal provided by the radar module is displayed through the OSD interface.

In one embodiment of the present invention, the warning condition is that a relative distance between the bicycle and the rear-approaching vehicle is within a first detection range.

In one embodiment of the present invention, the screen of the display module is adapted for being in the sleep mode when the relative distance does not reach a second detection range, and the second detection range is greater than the first detection range. The radar module is adapted for sending an activating signal to activate the screen into a screensaver mode when the relative distance is within the second detection range, the screen is adapted for being awakened after receiving the trigger signal to display the image information of the rear-approaching vehicle sent from the camera module. And, an incoming vehicle warning signal provided by the radar module is displayed through an OSD interface.

In one embodiment of the present invention, the warning condition is that a time-to-collision (TTC) of the rear-approaching vehicle is within a first warning time.

In one embodiment of the present invention, the screen of the display module is adapted for being in the sleep mode when the time-to-collision does not reach a second warning time, and the second warning time is greater than the first warning time. The radar module is adapted for sending an activating signal to activate the screen into a screensaver mode when the time-to-collision is in the second warning time. The screen is adapted for being awakened after receiving the trigger signal to display the image information of the rear-approaching vehicle sent from the camera module and display an incoming vehicle warning signal provided by the radar module through an OSD interface.

In one embodiment of the present invention, the riding auxiliary warning device further including a warning module. The warning module is disposed on the faucet of the bicycle and electrically connected to the radar module.

In one embodiment of the present invention, when the radar module detects that the rear-approaching vehicle reaches the warning condition, the radar module is adapted for triggering the warning module to provide a warning signal.

In one embodiment of the present invention, the warning module is selected from either a buzzer or a vibrator.

In one embodiment of the present invention, the riding auxiliary warning device further includes a wearable component communicated with the radar module. When the radar module detects that the rear-approaching vehicle reaches the warning condition, the radar module is adapted for triggering the wearable component to provide a warning signal.

In one embodiment of the present invention, the riding auxiliary warning device further includes a rear taillight component electrically connected to the radar module.

Because, at ordinary times, the camera module is in the sleep mode and the display module is also in the sleep mode or the screensaver mode, the power usage of the entire riding auxiliary warning device can be conserved to achieve the effect of power saving, thereby extending the usage time of the riding auxiliary warning device. In addition, owing to the constant detection of the radar module, the rider can wait for the radar module to trigger the warning module and issue the warning signal before viewing the screen, thus avoiding safety concerns caused by the rider having to look down at the screen from time to time.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
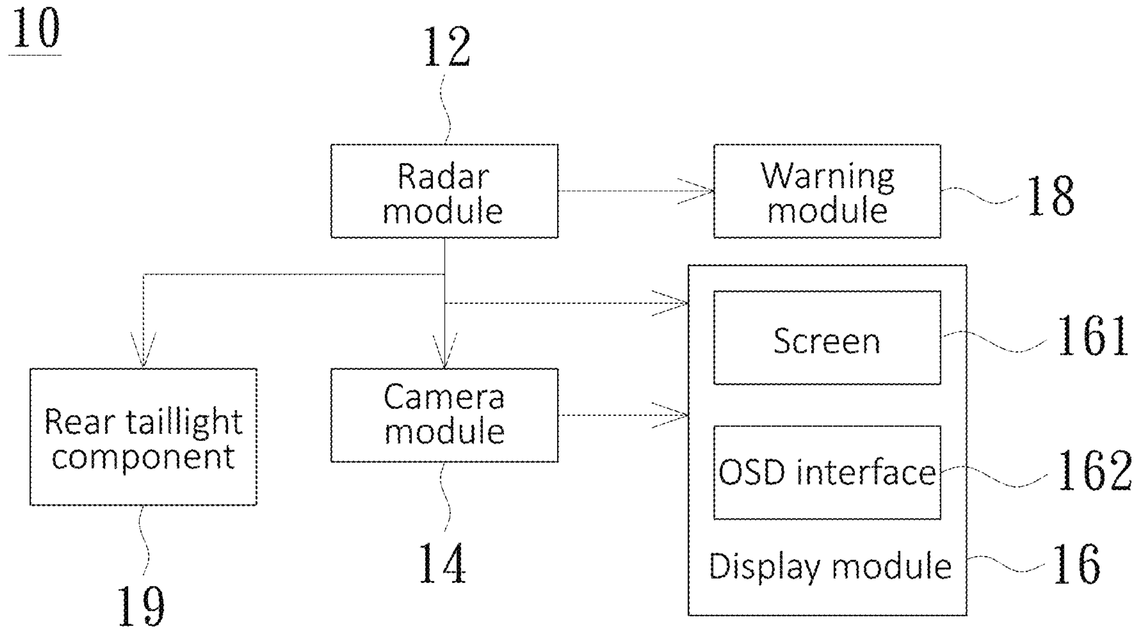
FIG. 1 is a block schematic diagram of a riding auxiliary warning device according to an embodiment of the present invention.
Figure 2:
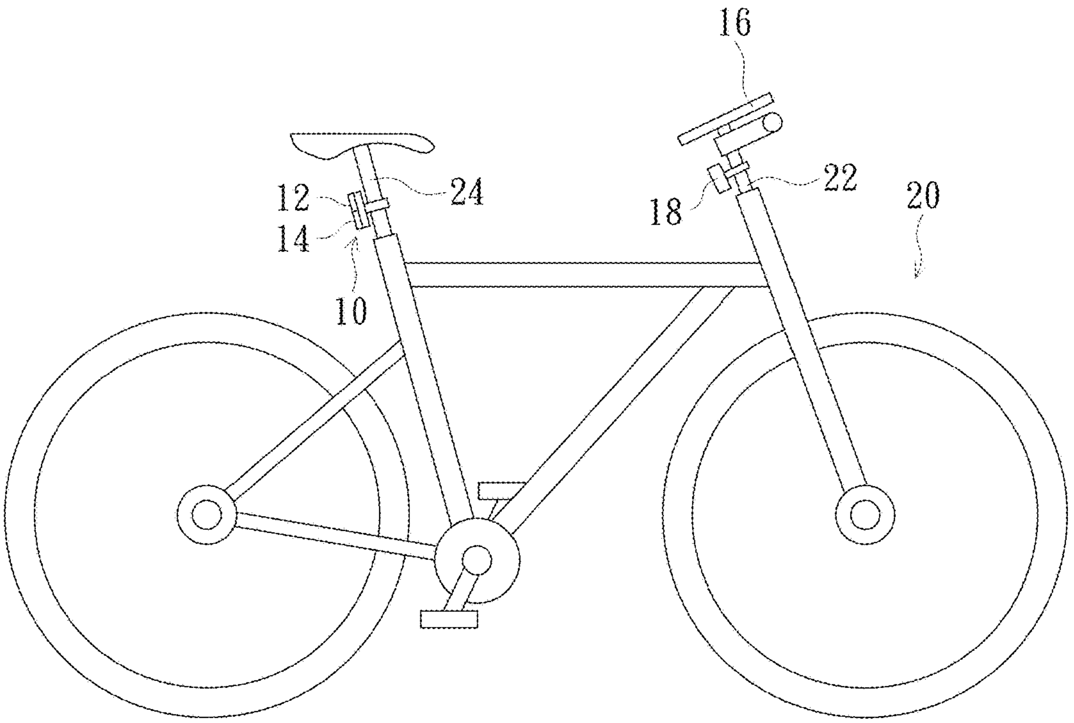
FIG. 2 is a schematic diagram of an application of the riding auxiliary warning device and a bicycle according to an embodiment of the present invention.

FIG. 1 is a block schematic diagram of a riding auxiliary warning device according to an embodiment of the invention. FIG. 2 is a schematic diagram of an application of the riding auxiliary warning device and a bicycle according to an embodiment of the invention. As shown in FIGS. 1 and 2, the riding auxiliary warning device 10 is adapted for installation on the bicycle 20. The bicycle 20 includes a faucet 22 and an end fixing component 24. The riding auxiliary warning device 10 includes a radar module 12, a camera module 14, and a display module 16. The radar module 12 is disposed at the end fixing component 24 of the bicycle 20. The radar module 12 is adapted for detecting a rear-approaching vehicle (not shown in the figures), and sending a trigger signal when a warning condition is reached between the detected rear-approaching vehicle and the bicycle 20. The camera module 14 disposed on the bicycle 20 and electrically connected to the radar module 12. The camera module 14 is adapted for being in a sleep mode when the warning condition between the rear-approaching vehicle and the bicycle 20 is not reached. And, the camera module 14 is adapted for being activated after receiving the trigger signal sent from radar module 12 when the warning condition is reached between the bicycle 20 and the rear-approaching vehicle, the camera module 14 thereon is activated to take pictures of the rear-approaching vehicle and sends image information of the rear-approaching vehicle. The display module 16 is disposed on the faucet 22 of the bicycle 20 and electrically connected to the radar module 12 and the camera module 14. The display module 16 has a screen 161, and the screen 161 is adapted for displaying image information of the rear-approaching vehicle.

The end fixing component 24 can be, but is not limited to, a seat tube, a rack, or a taillight of the bicycle 20. As shown in FIG. 2, the radar module 12 is, for example, disposed on the seat tube of the bicycle 20 and faces toward rear of the bicycle 20, but is not limited thereto. The radar module 12 is, for example, a millimeter wave radar. In one embodiment, the camera module 14 can also be disposed at the end fixing component 24. And, the camera module 14 is connected with the radar module 12 through a transmission line or a communication connection, or the radar module 12 and the camera module 14 can be integrated into one. In addition, the radar module 12 can be in communication connection with the display module 16 on the faucet 22. In one embodiment, as shown in FIG. 1, the riding auxiliary warning device 10 further includes a rear taillight component 19 that is electrically connected to the radar module 12 so as to trigger the rear taillight component 19 to enter the flashing mode through the radar module 12. The rear taillight component 19 can also be integrated with the camera module 14.

In one embodiment, as shown in FIG. 1 and FIG. 2, the riding auxiliary warning device 10 further includes a warning module 18. The warning module 18 is disposed on the faucet 22 of the bicycle 20 and electrically connected to the radar module 12. The radar module 12 triggers the warning module 18 to provide a warning signal when the radar module 12 detects that the warning condition between the bicycle 20 and the rear-approaching vehicle is reached. The warning module 18 can be selected from either a buzzer or a vibrator. After being triggered, the buzzer can make a sound, and the vibrator can produce vibrations.

Continuing with the above description, specifically, the warning condition is that a relative distance between the bicycle 20 and the incoming vehicle is within a first detection range, or the warning condition is, for example, a time-to-collision of the rear-approaching vehicle is within a first warning time. The time-to-collision is equal to the relative distance/relative speed. In one embodiment, the camera module 14 is adapted for being in the sleep mode when the relative distance between the bicycle 20 and the rear-approaching vehicle does not reach the first detection range (or the time-to-collision does not reach the first warning time). And, the camera module 14 is activated after receiving the trigger signal sent from the radar module 12 to take the pictures of the rear-approaching vehicle when the radar module 12 detects that the relative distance is within the first detection range (or the time-to-collision is within the first warning time). In one embodiment, the first detection range can be, for example, 70 meters or within a 3.5-second range for the rear-approaching vehicle (assuming that the maximum relative speed of the rear-approaching vehicle is 72 km/h, i.e., 20 m/sec).

Figure 3:
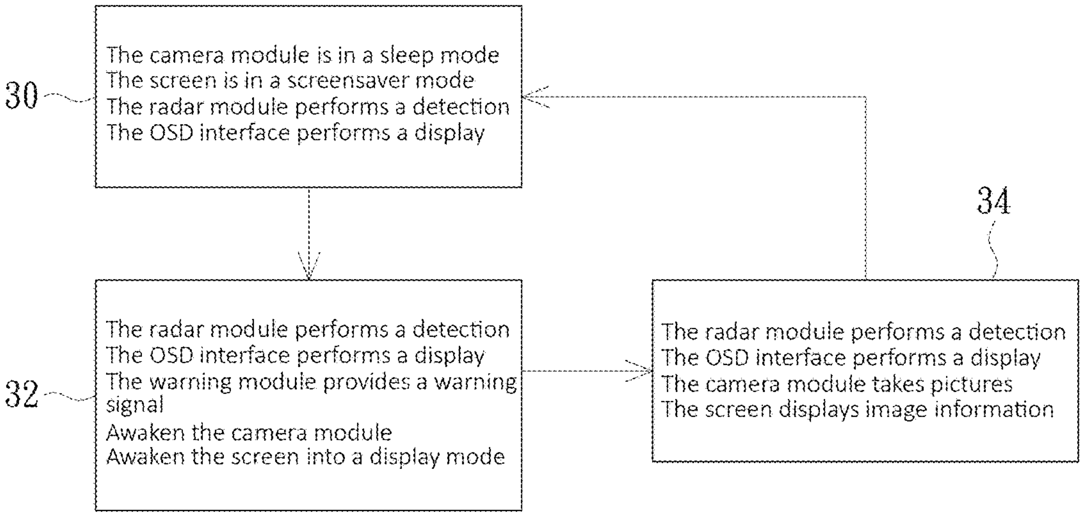
FIG. 3 is a schematic diagram of an application of the riding auxiliary warning device in a first state mode according to an embodiment of the present invention.

Continuing from the above description, the display module can optionally have three state modes when the camera module is in the sleep mode. As shown in FIG. 1, the display module 16 further includes an on-screen display (OSD) interface 162. FIG. 3 is a schematic diagram of an application of the riding auxiliary warning device in a first state mode according to an embodiment of the present invention. As shown in the figures, in the first state mode, when there is no rear-approaching vehicle or the rear-approaching vehicle does not reach the warning condition, according to block 30, the camera module 14 is in the sleep mode, the screen 161 of the display module 16 is in a screensaver mode, and the radar module 12 constantly detects a status of the rear-approaching vehicle, and through the OSD interface 162, displays the incoming vehicle warning signal provided by the radar module 12. When the radar module 12 detects the rear-approaching vehicle that reached the warning condition, according to block 32, in addition to the radar module 12 constantly detecting and the OSD interface 162 constantly displaying, the warning module 18 is triggered to provide the warning signal that awakened the camera module 14, and cause the screen 161 to end the screensaver mode and enter the display mode; and further according to the block 34, through the camera module 14 takes the pictures of the rear-approaching vehicle, and the screen 161 displays the image information of the rear-approaching vehicle for a rider of the bicycle 20 to view. Additionally, the camera module 14 takes the pictures within a set period of time (e.g., 10 seconds), if the radar module 12 detects that there is no rear-approaching vehicle or the warning condition is not reached during the set period of time, the camera module 14 will enter the sleep mode again after the set period of time and the screen 161 will be in the screensaver mode again (as shown in the block 30).

That is, in the first state mode, at ordinary times, the camera module 14 is asleep and the screen 161 is in the screensaver mode to conserve the power usage of the riding auxiliary warning device 10. And, the radar module 12 detects the rear-approaching vehicle and displays the incoming vehicle warning signal on the OSD interface 162. The warning module 18 (e.g., a buzzer) sends an audio alarm and activates the camera module 14 to display the screen 161 of the display module 16 when the radar module 12 detects that the rear-approaching vehicle enters the 3.5-second range or 70 meters. For example, the screen 161 of the display module 16 begins to display the image information of the rear-approaching vehicle normally when the rear-approaching vehicle enters a 3-second range or 60 meters, which provided the image information of the rear-approaching vehicle for the rider of the bicycle 20 to watch the rear-approaching vehicle on the screen 161. When the camera module 14 is in operation, for example, within 10 seconds and there is no rear-approaching vehicle or the warning condition is not reached, the camera module 14 re-enters the sleep mode again after 10 seconds of operation, thus the effect of power saving has been achieved.

Figure 4:
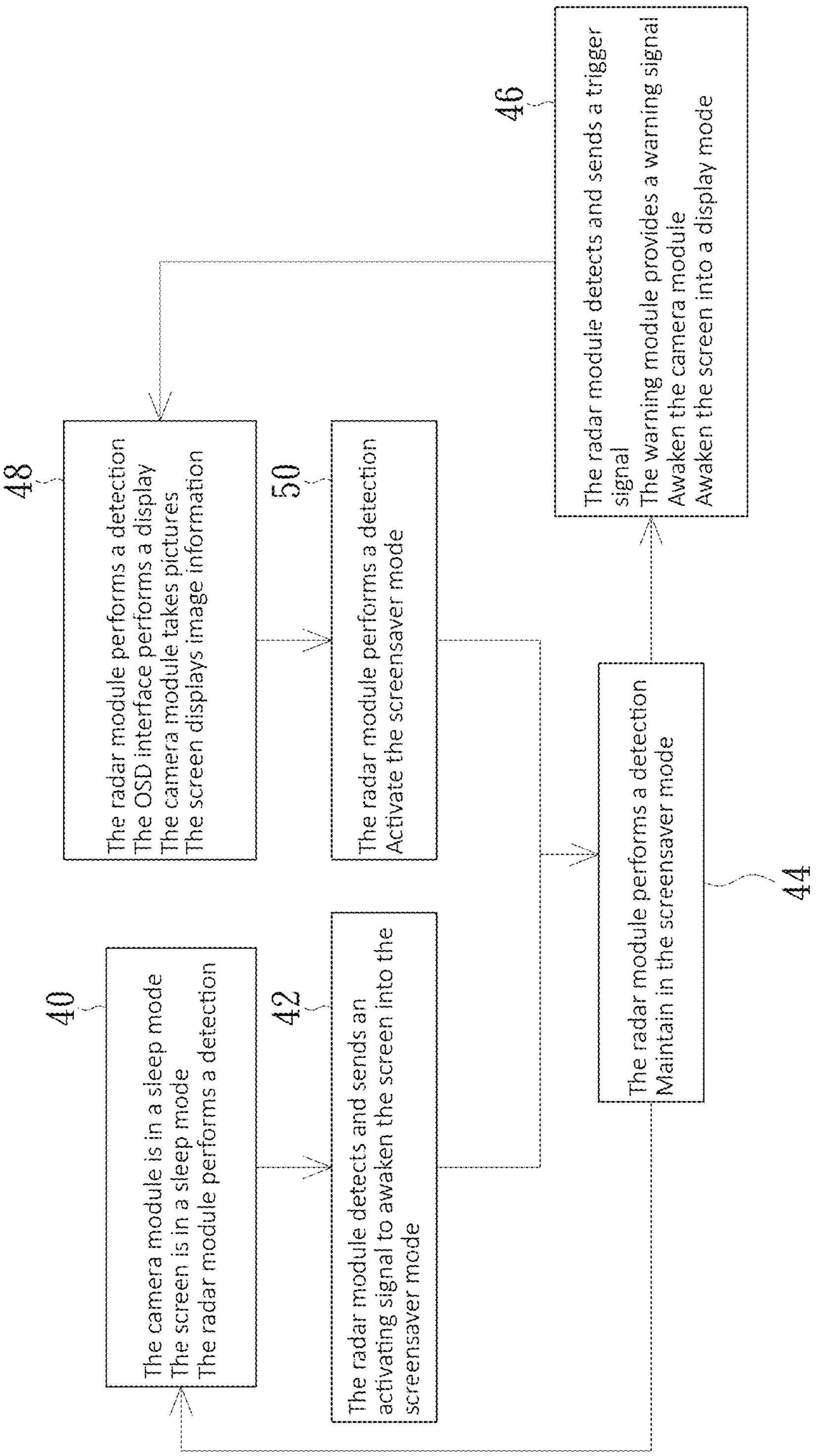
FIG. 4 is a schematic diagram of an application of the riding auxiliary warning device in a second state mode according to an embodiment of the present invention.

FIG. 4 is a schematic diagram of an application of the riding auxiliary warning device in a second state mode according to an embodiment of the present invention. As shown in the figure, in the second state mode, when there is no rear-approaching vehicle or the rear-approaching vehicle does not reach the warning condition, according to block 40, the camera module 14 is in the sleep mode, the screen 161 of the display module 16 is also in the sleep mode for part of the time, and the radar module 12 constantly detects the state of rear-approaching vehicle. A duration of the sleep mode of the screen 161 can be different from a duration of the sleep mode of the camera module 14. In one embodiment, the duration of the sleep mode of the camera module 14 is shorter than the duration of the sleep mode of the screen 161; that is, the screen 161 can be awakened first, but is not limited thereto. The duration of the sleep mode of the screen 161 can also be the same as the duration of the sleep mode of the camera module 14, and be awakened at the same time.

Specifically, the screen 161 of the display module 16 is in the sleep mode when the radar module 12 detects that the relative distance between the bicycle 20 and the rear-approaching vehicle does not reach the second detection range (or the time-to-collision does not reach the second warning time), wherein the second detection range is greater than the first detection range. According to block 42, the radar module 12 sends an activating signal to activate the screen 161 from the sleep mode into the screensaver mode when the relative distance is in the second detection range (or the time-to-collision is in the second warning time); then if the relative distance is in the second detection range but does not reach the first detection range (or the time-to-collision is in the second warning time but does not reach the first warning time), then according to block 44, screen 161 maintains in the screensaver mode. With constant detection of the radar module 12, if there is no rear-approaching vehicle, or the relative distance does not reach the second detection range, or the time-to-collision does not reach the second warning time, the screen 161 will re-enter the sleep mode again, which is shown in block 40. In one embodiment, the second detection range can be, for example, 120 meters or a 6-second range for the rear-approaching vehicle (assuming that the maximum relative speed of the rear-approaching vehicle is 20 m/sec).

Continuing from the above description, the screen 161 maintains in the screensaver mode and the radar module 12 constantly performs a detection. Upon the relative distance (or time-to-collision) is detected to be shortened and is in the first detection range (first warning time), further according to the block 46, the radar module 12 thereon triggers the warning module 18 to provide the warning signal and sends the trigger signal to the camera module 14 and the display module 16 to awaken the camera module, and the display module 16 ends the screensaver mode and awakens the screen 161 into the display mode. And further according to block 48, the camera module 14 takes the pictures of the rear-approaching vehicle and displays the image information of the rear-approaching vehicle through the screen 161 for the rider of the bicycle 20 to view, and meanwhile, the incoming vehicle warning signal is displayed on the OSD interface 162. In addition, when the camera module 14 takes the pictures within the set period of time (e.g., 10 seconds), the screensaver mode of the screen 161 is activated again according to block 50, if the radar module 12 detects that there is no rear-approaching vehicle or the warning condition is not reached during the set period of time. Furthermore, as shown in block 44, the screen 161 maintains in the screensaver mode. As the constant detection of the radar module 12, the display module 16 controls the screen 161 to enter the sleep mode (as shown in block 40) or enter the display mode (as shown in block 46) according to the state of the rear-approaching vehicle detected by the radar module 12.

That is, in the second state mode, during normal conditions, the camera module 14 and the display module 16 are fully asleep to conserve power, and the radar module 12 detects the rear-approaching vehicle. When the radar module 12 detects a rear-approaching vehicle and the detected rear-approaching vehicle enters within a distance of, for example, the 6-second range or 120 meters, the display module 16 activates a main control and enters the screen-saver mode. When the radar module 12 detects a rear-approaching vehicle and the detected rear-approaching vehicle enters within the 3.5-second range or 70 meters, the warning module 18 (e.g., the buzzer) sends the audio alarm, activates the camera module 14, and awakens the screen 161 to enter the display mode. The screen 161 starts to display the camera module normally when the rear-approaching vehicle enters the 3-second range or 60 meters. The image information of the rear-approaching vehicle captured by the camera module 14 is used for the rider of the bicycle 20 to watch the rear-approaching vehicle on the screen 161. At the same time, the incoming vehicle warning signal is also displayed through the OSD interface. The camera module 14 re-enters the sleep mode again after operating for 10 seconds to achieve the effect of power saving when the camera module 14 is operating for, for example, 10 seconds, and there is no rear-approaching vehicle or the warning condition is not reached.

Figure 5:
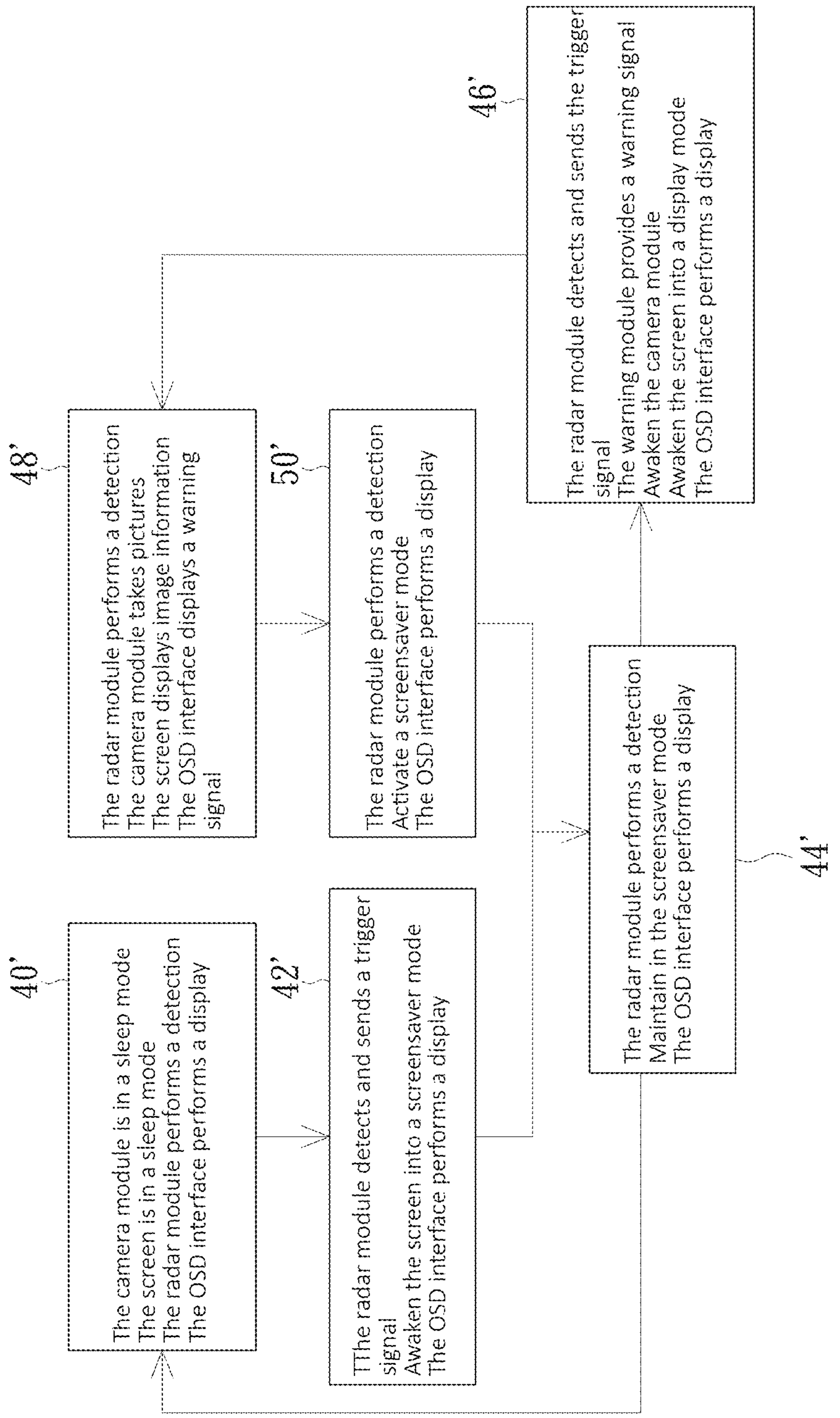
FIG. 5 is a schematic diagram of an application of the riding auxiliary warning device in a third state mode according to an embodiment of the present invention.

FIG. 5 is a schematic diagram of an application of the riding auxiliary warning device in a third state mode according to an embodiment of the invention, as shown in blocks 40', 42', 44', 46', 48', and 50'. The difference between the third state mode and the second state mode is mainly that in the third state mode, the OSD interface 162 of the display module 16 constantly displays. And, the activated or awakened conditions of camera module 14 and screen 161 are the same as the second state mode, and no redundant detail is to be given herein.

Figure 6:
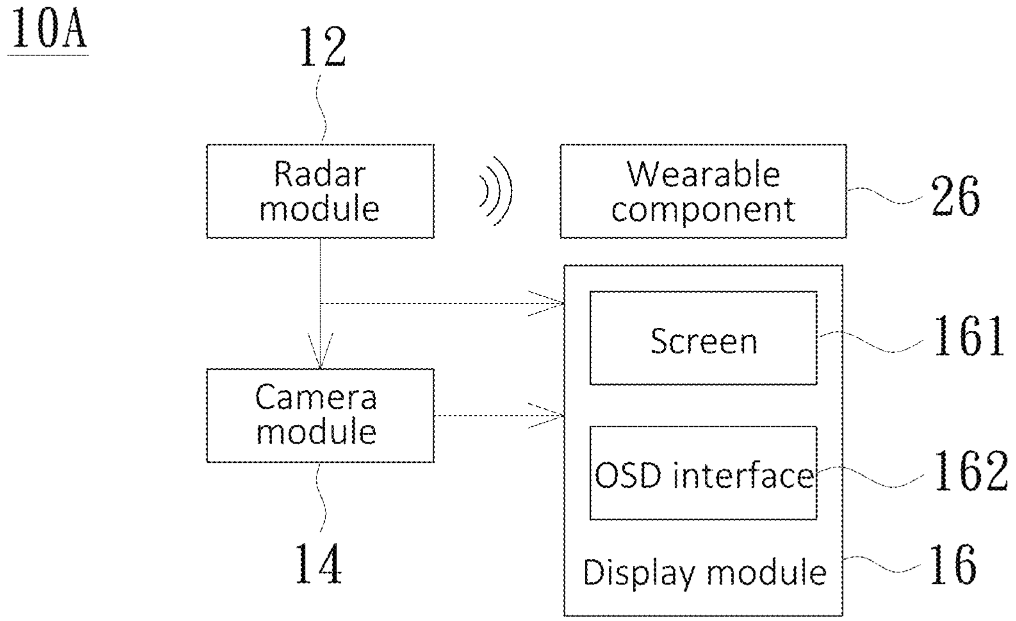
FIG. 6 is a block schematic diagram of a riding auxiliary warning device according to another embodiment of the present invention.

On the other hand, in one embodiment, the warning module 18 can be replaced by a wearable component. FIG. 6 is a block schematic diagram of a riding auxiliary warning device according to another embodiment of the present invention. As shown in FIG. 6, the riding auxiliary warning device 10A includes the radar module 12, the camera module 14, the display module 16, and a wearable component 26. Among them, the configuration and relationship of the radar module 12, the camera module 14, and the display module 16 have been disclosed in the embodiment shown in FIG. 1, and no redundant detail is to be given herein. The radar module 12 is in communication connection with the wearable component 26. The radar module 12 is adapted for triggering the wearable component 26 to provide a warning signal when the radar module 12 detects the rear-approaching vehicle and reaches the warning condition. In one embodiment, the wearable component 26 is, for example, an earphone or a mobile phone, and the radar module 12 is adapted for using Bluetooth or wireless communication to emit a sound or vibrations through the earphone or the mobile phone to remind the rider to watch the screen 161.

According to the above description, in the riding auxiliary warning device of the present embodiment, since the camera module is in the sleep mode at ordinary times (or normal working state), and the display module is also in the sleep mode or the screensaver mode at ordinary times (or normal working state), the power usage of the entire riding auxiliary warning device can be conserved to achieve the effect of power saving, thereby extending the usage time of the riding auxiliary warning device. Furthermore, by installing the riding auxiliary warning device on the bicycle and through the constant detection of the radar module, the rider can wait until the radar module triggers the warning module to issue a warning before viewing the screen, thus avoiding the safety concerns caused by the rider having to look down at the screen from time to time.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A riding auxiliary warning device adapted for being installed on a bicycle, the bicycle comprising a faucet and an end fixing component, and the riding auxiliary warning device comprising:

a radar module, disposed on the end fixing component of the bicycle, wherein the radar module is adapted for detecting a rear-approaching vehicle and sending a trigger signal when a warning condition is reached between the detected rear-approaching vehicle and the bicycle, wherein the warning condition is that a relative distance between the bicycle and the rear-approaching vehicle is within a first detection range;

a camera module, disposed on the bicycle and electrically connected to the radar module, wherein the camera module is adapted for being in a sleep mode when the warning condition between the rear-approaching vehicle and the bicycle is not reached, and the camera module is adapted for being activated after receiving the trigger signal to take pictures of the rear-approaching vehicle and sending image information of the rear-approaching vehicle; and a display module, disposed on the faucet of the bicycle and electrically connected to the radar module and the camera module, wherein the display module comprises a screen and an on-screen display (OSD) interface, and the screen is adapted for at least displaying the image information of the rear-approaching vehicle;

wherein the screen of the display module is adapted for being in the sleep mode when the relative distance does not reach a second detection range, and the second detection range is greater than the first detection range, wherein the radar module is adapted for sending an activating signal to activate the screen into a screen-saver mode when the relative distance is within the second detection range, wherein the screen is adapted for being awakened after receiving the trigger signal to display the image information of the rear-approaching vehicle sent from the camera module, and an incoming vehicle warning signal provided by the radar module is displayed through the on-screen display interface.

2. The riding auxiliary warning device according to claim 1, wherein the end fixing component is a seat tube, a rack, or a taillight of the bicycle.

3. The riding auxiliary warning device according to claim 1, wherein the camera module is disposed at the end fixing component, and the camera module is connected with the radar module through a transmission line or a communication connection.

4. The riding auxiliary warning device according to claim 1, the radar module is in communication connection with the display module.

5. The riding auxiliary warning device according to claim 1, wherein the display module is adapted for activating the screen to display the image information of the rear-approaching vehicle sent from the camera module after receiving the trigger signal.

6. A riding auxiliary warning device adapted for being installed on a bicycle, the bicycle comprising a faucet and an end fixing component, and the riding auxiliary warning device comprising:

a radar module, disposed on the end fixing component of the bicycle, wherein the radar module is adapted for detecting a rear-approaching vehicle and sending a trigger signal when a warning condition is reached between the detected rear-approaching vehicle and the bicycle, wherein the warning condition is that a time-to-collision of the rear-approaching vehicle is within a first warning time;

a camera module, disposed on the bicycle and electrically connected to the radar module, wherein the camera module is adapted for being in a sleep mode when the warning condition between the rear-approaching vehicle and the bicycle is not reached, and the camera module is adapted for being activated after receiving the trigger signal to take pictures of the rear-approaching vehicle and sending image information of the rear-approaching vehicle; and a display module, disposed on the faucet of the bicycle and electrically connected to the radar module and the camera module, wherein the display module comprises a screen and an on-screen display (OSD) interface, and the screen is adapted for at least displaying the image information of the rear-approaching vehicle;

wherein the screen of the display module is adapted for being in the sleep mode when the time-to-collision does not reach a second warning time, and the second warning time is greater than the first warning time, wherein the radar module is adapted for sending an activating signal, to activate the screen into a screen-saver mode when the time-to-collision is in the second warning time, wherein the screen is adapted for being awakened after receiving the trigger signal, to display the image information of the rear-approaching vehicle sent from the camera module, and display an incoming vehicle warning signal provided by the radar module through the on-screen display interface.

7. The riding auxiliary warning device according to claim 1, further comprising a warning module, wherein the warning module is disposed on the faucet of the bicycle and electrically connected to the radar module.

8. The riding auxiliary warning device according to claim 7, wherein when the radar module detects that the rear-approaching vehicle reaches the warning condition, the radar module is adapted for triggering the warning module to provide a warning signal.

9. The riding auxiliary warning device according to claim 7, wherein the warning module is selected from either a buzzer or a vibrator.

10. The riding auxiliary warning device according to claim 1, further comprising a wearable component communicated with the radar module, wherein when the radar module detects that the rear-approaching vehicle reaches the warning condition, the radar module is adapted for triggering the wearable component to provide a warning signal.

11. The riding auxiliary warning device according to claim 1, further comprising a rear taillight component electrically connected to the radar module.

12. The riding auxiliary warning device according to claim 6, wherein the camera module is disposed at the end fixing component, and the camera module is connected with the radar module through a transmission line or a communication connection.

13. The riding auxiliary warning device according to claim 6, wherein the radar module is in communication connection with the display module.

14. The riding auxiliary warning device according to claim 6, wherein the display module is adapted for activating the screen to display the image information of the rear-approaching vehicle sent from the camera module after receiving the trigger signal.

15. The riding auxiliary warning device according to claim 6, further comprising a warning module, wherein the warning module is disposed on the faucet of the bicycle and electrically connected to the radar module.

16. The riding auxiliary warning device according to claim 6, further comprising a wearable component communicated with the radar module, wherein when the radar module detects that the rear-approaching vehicle reaches the warning condition, the radar module is adapted for triggering the wearable component to provide a warning signal.

* * * * *